(12) United States Patent
Bai

(10) Patent No.: US 12,475,700 B2
(45) Date of Patent: Nov. 18, 2025

(54) IMAGE RECOGNITION

(71) Applicant: SHENZHEN TCL NEW TECHNOLOGY CO., LTD., Guangdong (CN)

(72) Inventor: Yinbo Bai, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 337 days.

(21) Appl. No.: 18/311,208

(22) Filed: May 2, 2023

(65) Prior Publication Data
US 2023/0267729 A1    Aug. 24, 2023

Related U.S. Application Data

(63) Continuation-in-part of application No. PCT/CN2021/128220, filed on Nov. 2, 2021.

(30) Foreign Application Priority Data

Nov. 4, 2020 (CN) .......................... 202011221473.6

(51) Int. Cl.
*G06V 10/96* (2022.01)
*G06F 3/01* (2006.01)
(Continued)

(52) U.S. Cl.
CPC ............ *G06V 10/945* (2022.01); *G06F 3/013* (2013.01); *G06F 3/0488* (2013.01); *G06F 3/167* (2013.01);
(Continued)

(58) Field of Classification Search
USPC ....... 358/1.1–3.29, 1.11–1.18; 382/103–118, 382/155–225; 704/1–275; 715/273–277,
(Continued)

(56) References Cited

U.S. PATENT DOCUMENTS

2017/0357877 A1* 12/2017 Lin .................... G06V 20/47
2018/0349008 A1* 12/2018 Manzari ................ H04N 23/69
(Continued)

FOREIGN PATENT DOCUMENTS

| CN | 102316263 A | 1/2012 |
| CN | 103428464 A | 12/2013 |

(Continued)

OTHER PUBLICATIONS

Wang, Bao-yun; Information Obtaining Method, Display Device and Server; 2020 (Year: 2020).*

(Continued)

*Primary Examiner* — Marcellus J Augustin
(74) *Attorney, Agent, or Firm* — PV IP PC; Wei Te Chung

(57) ABSTRACT

In an image recognition method, a unit duration is set according to the actual number of object boxes. External voice information is obtained or a focus event is monitored within the unit duration. One or more target object boxes are selected according to at least one of the external voice information or the focus event. Deduplication processing is performed on target object images respectively contained in the target object boxes.

18 Claims, 2 Drawing Sheets

(51) Int. Cl.
  *G06F 3/0488* (2022.01)
  *G06F 3/16* (2006.01)
  *G06F 16/438* (2019.01)
  *G06V 10/94* (2022.01)
  *G06V 20/50* (2022.01)
  *G06V 30/26* (2022.01)
  *G06V 40/00* (2022.01)
  *G06V 40/16* (2022.01)
  *G10L 15/08* (2006.01)
  *G10L 15/22* (2006.01)
  *H04N 21/8549* (2011.01)

(52) U.S. Cl.
  CPC .............. *G06V 10/95* (2022.01); *G06V 20/50* (2022.01); *G06V 40/172* (2022.01); *G10L 15/08* (2013.01); *G10L 15/22* (2013.01); *G10L 2015/088* (2013.01)

(58) Field of Classification Search
  USPC .................................................. 715/726–866
  See application file for complete search history.

(56) References Cited

U.S. PATENT DOCUMENTS

| 2019/0258428 | A1 | 8/2019 | Tokuchi |
| 2022/0070016 | A1* | 3/2022 | Dai .................... H04L 12/2818 |
| 2025/0045320 | A1* | 2/2025 | Frieder .................... H04N 1/00 |

FOREIGN PATENT DOCUMENTS

| CN | 105760050 A | 7/2016 |
| CN | 106327426 A | 1/2017 |
| CN | 108363998 A | 8/2018 |
| CN | 108958592 A | 12/2018 |
| CN | 109034115 A | 12/2018 |
| CN | 109948497 A | 6/2019 |
| CN | 110781819 A | 2/2020 |
| CN | 111343512 A | 6/2020 |
| CN | 111639702 A | 9/2020 |
| CN | 112348077 A | 2/2021 |
| WO | 2020209097 A1 | 10/2020 |

OTHER PUBLICATIONS

International Search Report in International application No. PCT/CN2021/128220, mailed on Jan. 28, 2022.
Written Opinion of the International Search Authority in International application No. PCT/CN2021/128220, mailed on Jan. 28, 2022.
European Search Report in European application No. 21888551.5, mailed on Sep. 5, 2024.
Chinese Office Action issued in corresponding Chinese Patent Application No. 202011221473.6 dated Mar. 18, 2025, pp. 1-10.

* cited by examiner

IMAGE RECOGNITION

CROSS-REFERENCE TO RELATED APPLICATIONS

This application is a continuation of International Application No. PCT/CN2021/128220, filed on Nov. 2, 2021, which claims priority to Chinese Patent Application No. 202011221473.6, filed on Nov. 4, 2020. The disclosures of the aforementioned applications are incorporated herein by reference in their entireties.

TECHNICAL FIELD

The present application relates to image recognition.

BACKGROUND

With users' increasing requirements for cooking experience, a smart refrigerator with a large screen has been widely used. The smart refrigerator with the large screen may meet users' basic needs for audio-visual entertainment and additional needs of star-chasing entertainment. The user can conveniently browse entertainment information on the large screen of the smart refrigerator during a cooking process. For example, an image involving one or more entertainment stars may be display on a home page by the large screen of the smart refrigerator. In response to clicking or sliding on the home page by the user, the smart refrigerator may recognize respective portraits of the entertainment stars from the image and obtain their introduction information to display an introduction page to the user.

However, if respective portraits of a plurality of stars appear on the home page, it will generally take too long time for the smart refrigerator with the large screen to recognize all the respective portraits of the stars. The more stars are to be recognized, the greater probability recognition errors occur. Therefore, the conventional smart refrigerator with the large screen has low efficiency of recognizing characters appearing on the home page.

SUMMARY

In view of the above, an embodiment of the present application provides an image recognition method applicable to a smart terminal with a screen, the method including:
  determining a number of object boxes in a page displayed on the screen and setting a period of time based on the number of the object boxes, wherein each of the object boxes contains an object image;
  performing at least one of obtaining of external voice information within the period of time or monitoring of a focus event triggered within each of the object boxes within the period of time;
  selecting one or more target object boxes from the object boxes based on at least one of the obtained external voice information or the monitored focus event;
  obtaining one or more target object images respectively contained in the one or more target object boxes;
  performing deduplication processing on the target object images to obtain one or more deduplicated target object images; and
  recognizing the deduplicated target object images to obtain a target object recognition result.

Another embodiment of the present application provides an image recognition device, including a processor and a memory storing an image recognition program executable by the processor to perform the image recognition method described above.

Another embodiment of the present application provides computer readable storage medium storing thereon an image recognition program executable by a processor to perform the image recognition method described above.

DETAILED DESCRIPTION OF THE PREFERRED EMBODIMENTS

Some embodiments of the present application will be described in detail below in conjunction with the drawings. The embodiments are described for illustration only and are not intended to limit the present application.

Figure 1:
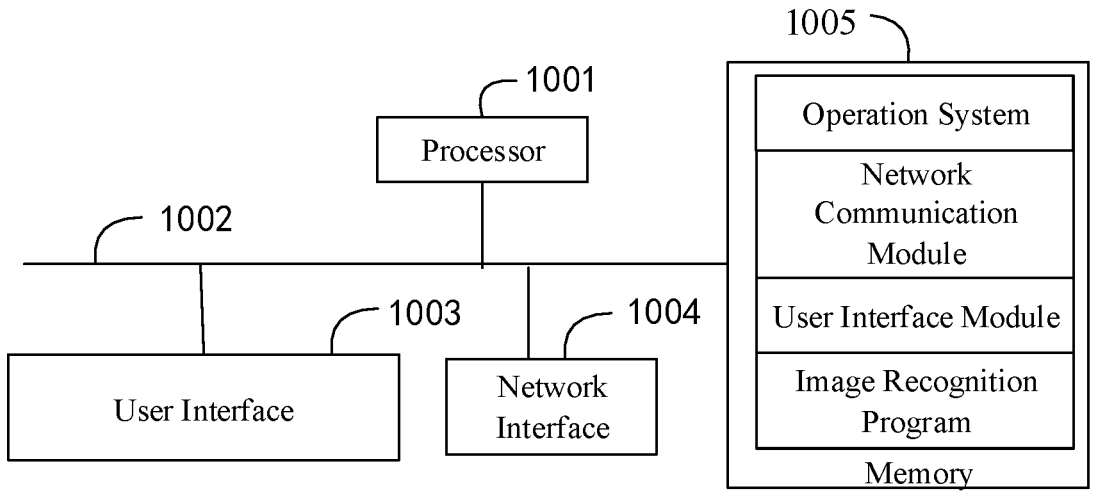
FIG. 1 is a schematic block diagram of an image recognition device according to an embodiment of the present application.

FIG. 1 illustrates a schematic block diagram of an image recognition device according to an embodiment of the present application.

The image recognition device according to an embodiment of the present application is a terminal with an image display, for example, a smart television set.

As shown in FIG. 1, the image recognition device may include a processor 1001 such as a CPU, a communication bus 1002, a user interface 1003, a network interface 1004, and a memory 1005. The communication bus 1002 is configured to implement connection communication between these components. Alternatively, the user interface 1003 may include a standard wired interface, or a wireless interface. The network interface 1004 may include a standard wired interface, or a wireless interface (e.g., a Wi-Fi interface). The memory 1005 may be a high-speed RAM memory, or may be a non-volatile memory. The memory 1005 may further be a memory device independent of the afore mentioned processor 1001.

It will be appreciated by those skilled in the art that the image recognition device shown in FIG. 1 does not be intended to limit the image recognition device, and the image recognition device may include more or less components than illustrated, or may combine certain components, or may have different component arrangements.

As shown in FIG. 1, the memory 1005 as a computer readable storage medium may include an operating system, a user interface module, or an image recognition program.

In the image recognition device shown in FIG. 1, the network interface 1004 is mainly configured to connect to the background server, for data communication with the background server. The user interface 1003 is configured to connect to a client (a use side) and perform data communication with the client. The processor 1001 may be configured to invoke the image recognition program stored in the memory 1005, and perform the following operations:
  determining a number of object boxes in a page displayed on the screen and setting a period of time based on the number of the object boxes, wherein each of the object boxes contains an object image;

performing at least one of obtaining of external voice information within the period of time or monitoring of a focus event triggered within each of the object boxes within the period of time;

selecting one or more target object boxes from the object boxes based on at least one of the obtained external voice information or the monitored focus event;

obtaining one or more target object images respectively contained in the one or more target object boxes;

performing deduplication processing on the target object images to obtain one or more deduplicated target object images; and recognizing the deduplicated target object images to obtain a target object recognition result.

In an embodiment, the performing of at least one of the obtaining of the external voice information or the monitoring of the focus event includes:

obtaining the external voice information within the period of time;

in response to determining that the external voice information contains a preset keyword, determining one or more of the object boxes indicated by the external voice information based on the preset keyword, and recording a voice event for each of the determined one or more of the object boxes; and monitoring the focus event triggered within each of the object boxes within the period of time, the focus event including at least one of a click event or a gaze event; and the selecting of the target object boxes from the object boxes includes: for each object box of the object boxes, converting the focus event and the voice event into respective weights based on a preset event weight conversion rule and obtaining a sum of the respective weights; and in response to determining that the sum of the respective weights reaches a preset weight threshold, taking the each object box as one of the target object boxes.

In an embodiment, the performing of the deduplication processing on the target object images includes:

obtaining pixel information of each of the target object images to obtain a pixel difference value between any two of the target object images based on the pixel information; and in response to determining that the pixel difference value meets a preset pixel difference condition, taking the any two of the target object images as a similar image pair, and retaining any one target object image of the similar image pair as one of the deduplicated target object images.

In an embodiment, the obtaining of the pixel information to obtain the pixel difference value includes:

obtaining a horizontal pixel value in a horizontal direction and a vertical pixel value in a vertical direction of each of the target object images as the pixel information; and obtaining a horizontal pixel value difference and a vertical pixel value difference between any two of the target object images based on the pixel information, as the pixel difference value, and the determining of that the pixel difference value meets the preset pixel difference condition includes:

in response to determining that each of the horizontal pixel difference value and the vertical pixel difference value is less than a preset pixel difference threshold, determining that the pixel difference value meets the preset pixel difference condition.

In an embodiment, the determining of the number of the object boxes includes: upon receiving a target recognition instruction, determining the number of the object boxes based on the target recognition instruction; and the setting of the period of time based on the number of the object boxes includes: taking the number of the object boxes as a timing value, and setting the period of time based on the timing value and a preset timing unit.

In an embodiment, the target object images include target character images.

the performing of the deduplication processing includes: performing the deduplication processing on the target character images to obtain one or more deduplicated target character images; and the recognizing of the deduplicated target object images to obtain the target object recognition result includes:

uploading the deduplicated target character images to a cloud server for recognizing the deduplicated target character images to obtain a target character recognition result; and receiving the target character recognition result from the cloud server as the target object recognition result.

In an embodiment, the processor 1001 may be configured to invoke the image recognition program stored in the memory 1005, and further perform the following operations:

after recognizing the deduplicated target object images to obtain the target object recognition result, generating target object introduction information based on the target object recognition result; and displaying the target object introduction information in the page.

Based on the above hardware structure, various embodiments of the image recognition method of the present application are provided.

With users' increasing requirements for cooking experience, a smart refrigerator with a large screen has been widely used. The smart refrigerator with the large screen may meet users' basic needs for audio-visual entertainment and additional needs of star-chasing entertainment. The user can conveniently browse entertainment information on the large screen of the smart refrigerator during a cooking process. For example, an image involving one or more entertainment stars may be display on a home page by the large screen of the smart refrigerator. In response to clicking or sliding on the home page by the user, the smart refrigerator may recognize respective portraits of the entertainment stars from the image and obtain their introduction information to display an introduction page to the user. However, if respective portraits of a plurality of stars appear on the home page, it will generally take too long time for the smart refrigerator with the large screen to recognize all the respective portraits of the stars. The more stars are to be recognized, the greater probability recognition errors occur. Therefore, the conventional smart refrigerator with the large screen has low efficiency of recognizing characters appearing on the home page.

In order to solve the above-mentioned issue, the present application provides an image recognition method. The image recognition method includes: setting a period of time according to an actual number of object boxes, so that the period of time is more suitable for a current scene and is not set too long or too short; obtaining external voice information and/or monitoring a focus event, and selecting a target object box based on the external voice information and/or the focus event, so that the target object box currently desired to be recognized by a user can be selected according to actual conditions, a recognition range and workload of a recognition task are reduced; and performing de-duplication processing on the target object image, so that the workload of the recognition task is further reduced, and the waste of resources and time caused by repeated recognition of the same content are avoided. Therefore, the efficiency of recognizing the de-duplicated target object image may be improved, thereby solving the technical problem that the efficiency of recognizing a character appearing in a page on a large screen of a current smart refrigerator is low.

Figure 2:
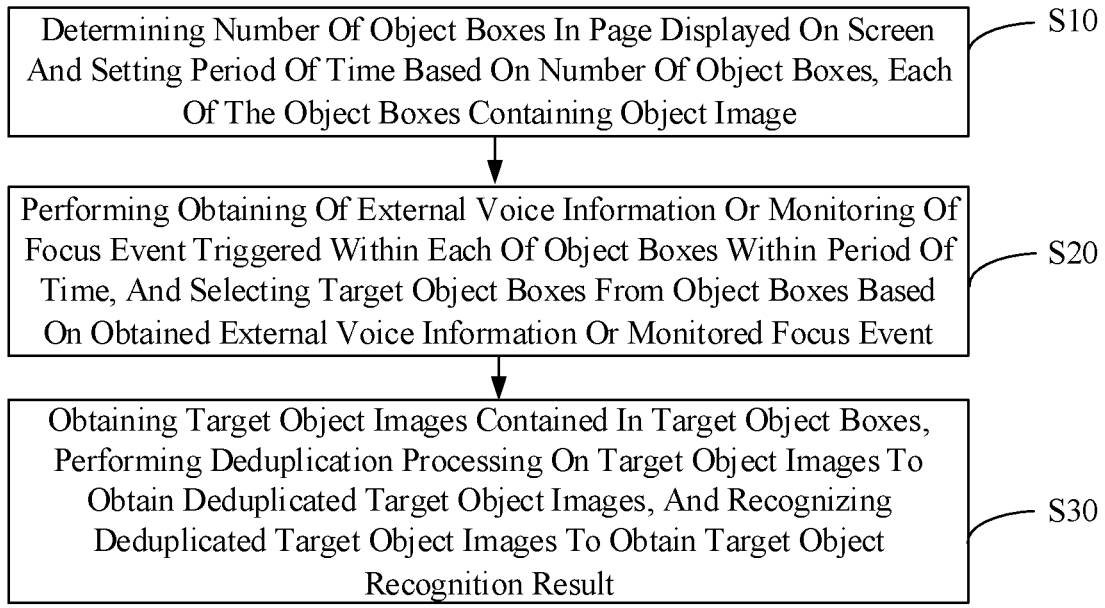
FIG. 2 is a schematic flowchart of an image recognition method according to an embodiment of the present application.
Figure 3:
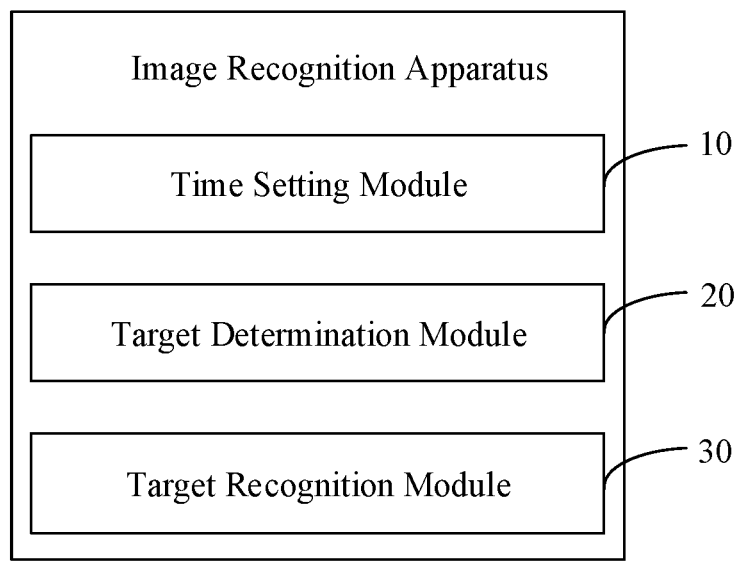
FIG. 3 is a schematic block diagram of an image recognition apparatus according to an embodiment of the present application.

Referring to FIG. 2 illustrating a schematic flowchart of an image recognition method according to an embodiment of the present application.

An embodiment of the present application provides an image recognition method applied to a smart terminal with a screen, and the image recognition method includes:

At Step S10, a number of object boxes in a page displayed on the screen is determined and a period of time is set according to the number of object boxes, each of the object boxes contains an object image.

In an embodiment, the method is applied to a smart terminal with a screen. The smart terminal generally is a smart household appliance with a screen, for example, a smart refrigerator, a smart washing machine, a smart television set, or the like. For convenience of description, a smart refrigerator is described as an example. The page is a content page displayed when the smart refrigerator with a large screen provides a function service or an entertainment service for a user. The page may involve images of various types of elements such as a character image and an article image. The object image is an image on the content page, such as a character or an article that may appear on the above page. The object box is a graphic box defining an object range, and a shape of the object box may be flexibly set according to actual requirements. For example, the shape can be rectangles, circles, polygons, or the like. The object box may be hidden in the page, or may be directly displayed. The number of objects in the object box may be one or more. Generally, one object box involves one object image. The period of time is a cycle duration for the selection and the recognition, and the period of time is started from a moment when the user enters the page. A large screen system of the smart refrigerator may directly detect a position and the number of the object boxes included in the page. The period of time may be set according to the number of the object boxes included in the page. In an embodiment, the number of the object boxes may be directly used as the duration value, and then an appropriate time unit may be assigned. Alternatively, some calculation may be made based on the number of the object boxes, and an obtained calculation result may be used as the duration value, and appropriate time unit may be assigned. The period of time may be variously set according to actual conditions.

At Step S20, at least one of obtaining of external voice information within the period of time or monitoring of a focus event triggered within each of the object boxes within the period of time is performed, and one or more target object boxes are selected from the object boxes based on at least one of the obtained external voice information or the monitored focus event; and In the present embodiment, the external voice information is voice feedback made by the user for the content in the page within a period of time. The external voice information is generally obtained through a receiver arranged in a smart refrigerator or an external receiver. Focus events include click events, gaze events, touch events, or the like. The click event means that the user clicks a position in the page through a remote control device, a key on the smart refrigerator, or a touch screen button on the smart refrigerator. The click event for one of the object box is determined by determining in which object box the click position occurs. The gaze event refers to that the smart refrigerator obtains a picture of the user gazing at the page based on a built-in camera device or an external camera device, obtains which object box the user is gazing at by analysis, and upon the gazing time reaches a preset gazing threshold value, a gazing event for the object box is recorded once. A touch event is a touch event that a user touches a certain position of the page based on the touch screen of a smart refrigerator, and one touch event may correspond to one touch action for the object box. The target object box may include some target object boxes selected from all the object boxes in the page. In an embodiment, all the object boxes in the page may be used as the target object boxes. In an embodiment, only some of the object boxes may be used as the target object boxes, or no target object box exists. The target object box may be selected by at least one of the external voice information or the focus event.

S30, one or more target object images respectively contained in the one or more target object boxes are obtained, deduplication processing is performed on the target object images to obtain one or more deduplicated target object images, and the deduplicated target object images is recognized to obtain a target object recognition result.

In an embodiment, the target object image is an object image included in the target object box. The target object images may be de-duplicated by reserving any one of the target object images having the similar subject. In an embodiment, the highest one of the pixels in of the target object images having the similar subject, or the lowest one of the pixels in of the target object images having the similar subject is reserved. The de-duplication processing is not limited herein, and may be variously set according to actual requirements. The target object recognition result is related information obtained after recognition of the target object image, and may include introduction content, associated content, or the like for the target object image.

As an example, when the large screen on the smart refrigerator is turned on and the entertainment function is selected by the user, the smart refrigerator displays to the user an entertainment page including five star images, each of which corresponds to one character box. The large screen system of the smart refrigerator takes twice the number of character boxes by calculation as the timing duration value, and assigns seconds as a unit of time, for example, sets ten seconds as the period of time. Within ten seconds started from the moment the user opens the page, the system begins to monitor the gaze event, the click event, the touch event triggered by the user, and to obtain the user's voice information within the ten seconds. If the user clicks a character in a certain character box and says statements such as "I don't know", "I have no idea", or the like, it is recorded as the click event and the voice event for the character box. The system performs selection on the five character boxes according to the information obtained in the ten seconds. If three character boxes are selected from the five character boxes as the target character boxes, the system starts to detect the characters in the three character boxes for duplicate checking, for example, by using facial recognition technology. If there is the same character in the at least two of the character boxes, one of the at least two character boxes is left. If there is no duplicate character in the character boxes, no de-duplication process is performed. If there is no duplication in the character boxes, the stars in the three character boxes may be performed recognition process and the recognition result is displayed on the corresponding position in the page for the user to view.

In an embodiment, a number of object boxes in a page displayed on the screen is determined and a period of time is set based on the number of the object boxes, each of the object boxes containing an object image; at least one of obtaining of external voice information within the period of time or monitoring of a focus event triggered within each of the object boxes within the period of time is performed; one or more target object boxes are selected from the object boxes based on at least one of the obtained external voice information or the monitored focus event; one or more target object images respectively contained in the one or more target object boxes are obtained; deduplication processing is performed on the target object images to obtain one or more deduplicated target object images; and the deduplicated target object images are recognized to obtain a target object recognition result. In view of above, in an embodiment of the present application, a period of time is set according to an actual number of object boxes, so that the period of time is more suitable for a current scene and is not set too long or too short; external voice information is obtained and/or a focus event is monitored, and a target object box is selected based on the external voice information and/or the focus event, so that the target object box currently desired to be recognized by the user can be selected according to actual conditions, a recognition range and workload of a recognition task are reduced; and the de-duplication processing is performed on the target object image, so that the workload of the recognition task is further reduced, and the waste of resources and time caused by repeated recognition of the same content are avoided. Therefore, the efficiency of recognizing the de-duplicated target object image may be improved, thereby solving the technical problem that the efficiency of recognizing a character appearing in a page on a large screen of a current smart refrigerator is low.

In an embodiment, based on the above embodiment shown in FIG. 2, another embodiment of the image recognition method of the present application is provided. In the present embodiment, the performing of at least one of the obtaining of the external voice information or the monitoring of the focus event includes: obtaining the external voice information within the period of time; in response to determining that the external voice information contains a preset keyword, determining one or more of the object boxes indicated by the external voice information based on the preset keyword, and recording a voice event for each of the determined one or more of the object boxes; and monitoring the focus event triggered within each of the object boxes within the period of time, the focus event including at least one of a click event or a gaze event, and the selecting of the target object boxes from the object boxes includes: for each object box of the object boxes, converting the focus event and the voice event into respective weights based on a preset event weight conversion rule and obtaining a sum of the respective weights; and in response to determining that the sum of the respective weights reaches a preset weight threshold, taking the each object box as one of the target object boxes.

In the present embodiment, the predetermined keyword may be a negative word having a similar meaning, such as "do not know", "no idea", "not sure", or the like, or a question like "who is this". The weight conversion rule for the preset event includes a mapping table in which the same or different weights corresponding to different types of events are recorded. In addition, different weights may be further set for different times of the same type of events. For example, for one to three click events, each click event corresponds to a weight of three, and for three to five click events, each click event may be set to correspond to a weight of four. The preset weight threshold may be variously set according to actual requirements. For example, for one object box, if three click events and one voice event are detected during the period of time, and each of the three click events corresponds to a weight of three, and one voice event corresponds to a weight of five, the sum of the weights for the object box during the period of time is fourteen. Assuming that the preset weight threshold value is ten, the large screen system of the smart refrigerator may determine this object box as the target object box.

In an embodiment, the obtaining target object images included in the target object frame and performing de-duplication processing on the target object images is implemented by:
obtaining pixel information of each of the target object images to obtain a pixel difference value between any two of the target object images based on the pixel information; and
in response to determining that the pixel difference value meets a preset pixel difference condition, taking the any two of the target object images as a similar image pair, and retaining any one target object image of the similar image pair as one of the deduplicated target object images.

In an embodiment, the large screen system of the smart refrigerator obtains pixel information of the target object image that is currently determined, such as a size of a pixel value, color scale information, or a gray value after converting the pixel information into a gray scale image. The system obtains pixel difference values between the respective target object images by comparison, and then determines whether the pixel difference values meet a preset pixel difference condition. If the system determines that the pixel difference value meets the preset pixel difference condition, the two target images corresponding to the pixel difference value are selected as the similar image pair and one of the two target images is retained as the target object image.

In an embodiment, the obtaining of the pixel information to obtain the pixel difference value includes:
obtaining a horizontal pixel value in a horizontal direction and a vertical pixel value in a vertical direction of each of the target object images as the pixel information; and
obtaining a horizontal pixel value difference and a vertical pixel value difference between any two of the target object images based on the pixel information, as the pixel difference value, and
the determining of that the pixel difference value meets the preset pixel difference condition includes:
in response to determining that each of the horizontal pixel difference value and the vertical pixel difference value is less than a preset pixel difference threshold, determining that the pixel difference value meets the preset pixel difference condition.

In an embodiment, the pixel information includes a horizontal pixel value and a vertical pixel value. The horizontal pixel value is a pixel value of the target object box in the horizontal direction, and the vertical pixel value is a pixel value of the target object box in the vertical direction. The system obtains the horizontal pixel value and the vertical pixel value of each target object box, obtains the horizontal pixel difference value and the vertical pixel difference value between the two target object boxes. Only when the horizontal pixel difference value and the vertical pixel difference value of two of the target object images both are smaller than the preset pixel difference threshold, the system determines that the two target images are similar, so that it is determined that the pixel difference values meet a preset pixel difference condition. Otherwise, it is determined that the pixel difference values do not meet the preset pixel difference condition.

In an embodiment, the target object box is further selected by combining the voice event and the focus event, so that the selection result more meets the actual requirement of the user, and the judgment of the user may be more accurate. The de-duplication processing is performing by retaining any one of the repeated target object images, so that de-duplication operation is easy and feasible. The horizontal pixel difference value and the vertical pixel difference value are obtained and it is determined whether both the horizontal pixel difference value and the vertical pixel difference value meet a preset condition, so that accuracy of an operation for determining the similar target images may be improved.

In an embodiment, based on the above embodiment shown in FIG. 2, yet another embodiment of the image recognition method of the present application is provided. In the present embodiment, Step S101 may be implemented by:
  upon receiving a target recognition instruction, determining the number of the object boxes based on the target recognition instruction; and
  taking the number of the object boxes as a timing value, and setting the period of time based on the timing value and a preset timing unit.

In an embodiment, the target recognition instruction may be sent by the user to the large screen of the smart refrigerator based on an entity or a touch button on the smart refrigerator, or a remote controller, or the like. After receiving the instruction, the system starts to detect the number of object boxes in the current display page. After the number of object boxes is determined, the system directly uses the number of object boxes as the timing value and assigns an appropriate unit of time for the number to obtain the final period of time. For example, if the system detects five object boxes in the page, the system determines that five seconds is the above-mentioned timing duration.

In an embodiment, the target object images include target character images.

The performing of the deduplication processing includes: performing the deduplication processing on the target character images to obtain one or more deduplicated target character images.

The recognizing of the deduplicated target object images to obtain the target object recognition result includes:
  uploading the deduplicated target character images to a cloud server for recognizing the deduplicated target character images to obtain a target character recognition result; and
  receiving the target character recognition result from the cloud server as the target object recognition result.

In an embodiment, the system recognizes image through a cloud server. The system uploads a de-duplicated target object image, such as a star image, to the cloud server while sending a recognition request. After receiving those, the cloud server identifies the introduction information of the star and feeds back the introduction information as a recognition result to the smart refrigerator.

In some embodiments, Step S30 may be implemented by:
  generating target object introduction information based on the target object recognition result, and displaying the target object introduction information in a page.

In an embodiment, the large screen system of the smart refrigerator integrates and typesets the target object recognition result that is currently obtained, and then displays them at the position relative to the character box in the page. For example, the name, sex, age, place of origin, work introduction, or the like of the star are typeset and then displayed at the bottom of the character box so that the user can browse it.

In an embodiment, the number of the object boxes is taken as the duration value of the period of time, so that the setting of the period of time is not only practical, but also easy to implement without the system consuming too much computational power. The target object image is recognized by using the cloud server, so that the recognition result is accuracy. The introduction information generated based on the recognition result is displayed in the page, so that the user may view the information instantly, thereby improving the user experience.

The present application further provides an image recognition apparatus.

The image recognition apparatus is implemented by:
  a time setting module 10 configured to determine a number of object boxes in a page displayed on the screen and set a period of time based on the number of the object boxes, each of the object boxes containing an object image;
  a target determination module 20 configured to obtain external voice information during the period of time and/or monitor a focus event triggered within each object box during the period of time, and select one or more target object boxes from the object boxes based on at least one of the obtained external voice information or the monitored focus event; and
  a target recognition module 30 configured to obtain one or more target object images respectively contained in the one or more target object boxes, and perform deduplication processing on the target object images to obtain one or more deduplicated target object images, and recognizing the deduplicated target object images to obtain a target object recognition result.

The present application further provides an image recognition device.

The image recognition apparatus includes a processor, a memory, and an image recognition program executable on the processor. The image recognition program is executable by the processor to perform the image recognition method described above.

The image recognition program is executable by the processor to perform the image recognition method according to various embodiments of the present application, and details are not described herein.

An embodiment of the present application provides a computer readable storage medium.

An image recognition program is stored on the computer readable storage medium according to an embodiment of the present application. The image recognition program is executable by the processor to perform the image recognition method described above.

The image recognition program is executable by the processor to perform operations in the image recognition method according to various embodiments of the present application, and details are not described herein.

It is to be noted that, the terms herein "comprises/include", "comprising/including", or any other variation thereof, are intended to cover a non-exclusive inclusion, such that a process, method, article, or system including a list of elements includes not only those elements but also other elements not expressly listed, or elements inherent to such process, method, article, or system. Without further limitation, an element listed after the statement "comprising a" does not preclude the present of another same element in the process, method, article or system including this element.

The above orders of embodiments of the present application are for descriptive purposes only and do not represent the merits of the embodiments.

From the above description of the embodiments, it will be clear to those skilled in the art that the above methods according to the embodiments can be implemented by software plus the necessary common hardware platform, or by a hardware. However, in many cases the former is the better implementation. Based on this, the technical solution of the present application, which essentially or rather contributes to the prior art, may be embodied in the form of a software product. The software product is stored in a storage medium (e.g. ROM/RAM, disk, CD-ROM) as described above, and includes a number of instructions to enable an image recognition device to perform the methods according to the various embodiments of the present application.

Some embodiments of the present application have been described above and are not intended to limit the scope of the present application. Any equivalent structure or process that can be made based on the description of the present application and the accompanying drawings shall fall within the scope of the present application.

What is claimed is:

1. An image recognition method applicable to a smart terminal with a screen, the image recognition method comprising:
    determining a number of object boxes in a page displayed on the screen and setting a period of time based on the number of the object boxes, wherein each of the object boxes contains an object image;
    performing at least one of obtaining of external voice information within the period of time or monitoring of a focus event triggered within each of the object boxes within the period of time;
    selecting one or more target object boxes from the object boxes based on at least one of the obtained external voice information or the monitored focus event;
    obtaining one or more target object images respectively contained in the one or more target object boxes;
    performing deduplication processing on the target object images to obtain one or more deduplicated target object images;
    recognizing the deduplicated target object images to obtain a target object recognition result;
    generating target object introduction information based on the target object recognition result; and
    displaying the target object introduction information in the page.

2. The image recognition method of claim 1, wherein the performing of at least one of the obtaining of the external voice information or the monitoring of the focus event comprises:
    obtaining the external voice information within the period of time;
    in response to determining that the external voice information contains a preset keyword, determining one or more of the object boxes indicated by the external voice information based on the preset keyword, and recording a voice event for each of the determined one or more of the object boxes; and
    monitoring the focus event triggered within each of the object boxes within the period of time, the focus event comprising at least one of a click event or a gaze event; and
    the selecting of the target object boxes from the object boxes comprises: for each object box of the object boxes,
        converting the focus event and the voice event into respective weights based on a preset event weight conversion rule and obtaining a sum of the respective weights; and
        in response to determining that the sum of the respective weights reaches a preset weight threshold, taking the each object box as one of the target object boxes.

3. The image recognition method of claim 2, wherein the converting of the focus event and the voice event into the respective weights comprises:
    determining a first number of times the focus event has occurred and a second number of times the voice even has occurred; and
    converting the focus event and the voice event into the respective weights based on the first number of times, the second number of times and the preset event weight conversion rule.

4. The image recognition method of claim 1, wherein the performing of the deduplication processing on the target object images comprises:
    obtaining pixel information of each of the target object images to obtain a pixel difference value between any two of the target object images based on the pixel information; and
    in response to determining that the pixel difference value meets a preset pixel difference condition, taking the any two of the target object images as a similar image pair, and retaining any one target object image of the similar image pair as one of the deduplicated target object images.

5. The image recognition method of claim 4, wherein
    the obtaining of the pixel information to obtain the pixel difference value comprises:
        obtaining a horizontal pixel value in a horizontal direction and a vertical pixel value in a vertical direction of each of the target object images as the pixel information; and
        obtaining a horizontal pixel value difference and a vertical pixel value difference between any two of the target object images based on the pixel information, as the pixel difference value, and
    the determining of that the pixel difference value meets the preset pixel difference condition comprises:
        in response to determining that each of the horizontal pixel difference value and the vertical pixel difference value is less than a preset pixel difference threshold, determining that the pixel difference value meets the preset pixel difference condition.

6. The image recognition method of claim 1, wherein
    the target object images comprise target character images; and
    the performing of the deduplication processing on the target object images comprises:
        recognizing the target character images respectively contained in the target object boxes by using a face recognition technology, to obtain a face recognition result; and
        in response to determining that the face recognition result indicates that two or more of the target character images involve a same character, selecting one of the two or more of the target character images as one of the deduplicated target object images.

7. The image recognition method of claim 1, wherein the performing of the deduplication processing on the target object images comprises:
   determining respective subjects of the target object images; and
   performing the deduplication processing on the target object images based on the respective subjects.

8. The image recognition method of claim 7, wherein the performing of the deduplication processing on the target object images based on the respective subjects comprises:
   determining two or more of the target object images having a same subject based on the respective subjects; and
   performing the deduplication processing on the two or more of the target object images based on respective image pixels of the two or more of the target object images.

9. The image recognition method of claim 1, wherein
   the determining of the number of the object boxes comprises: upon receiving a target recognition instruction, determining the number of the object boxes based on the target recognition instruction; and
   the setting of the period of time based on the number of the object boxes comprises: taking the number of the object boxes as a timing value, and setting the period of time based on the timing value and a preset timing unit.

10. The image recognition method of claim 1, wherein the target object images comprise target character images;
    the performing of the deduplication processing comprises: performing the deduplication processing on the target character images to obtain one or more deduplicated target character images; and
    the recognizing of the deduplicated target object images to obtain the target object recognition result comprises:
    uploading the deduplicated target character images to a cloud server for recognizing the deduplicated target character images to obtain a target character recognition result; and
    receiving the target character recognition result from the cloud server as the target object recognition result.

11. The image recognition method of claim 1, wherein
    the generating of the target object introduction information comprises: integrating the target object recognition result to obtain the target object introduction information corresponding to the target object recognition result; and
    the displaying of the target object introduction information in the page comprises: displaying the target object introduction information at respective positions in the page corresponding to ones of the target object boxes that respectively contain the deduplicated target object images.

12. The image recognition method of claim 1, wherein the monitoring of the focus event triggered within each of the object boxes comprises:
    obtaining a picture of a user gazing at the page;
    analyzing the picture to determine one of the object boxes gazed at by the user as a target box; and
    in response to determining that the user has gazed at the target box for a preset time, determining that a gaze event as the focus event has been triggered within the target box.

13. The image recognition method of claim 1, wherein the monitoring of the focus event triggered within each of the object boxes comprises:
    in response to detecting a click within the each of the object boxes, determining that a click event as the focus event has been triggered within the each of the object boxes.

14. The image recognition method of claim 1, wherein the monitoring of the focus event triggered within each of the object boxes comprises:
    in response to detecting a touch within the each of the object boxes, determining that a touch event as the focus event has been triggered within the each of the object boxes.

15. The image recognition method of claim 1, wherein the obtaining of the external voice information comprises:
    obtaining the external voice information through a receiver arranged in the smart terminal.

16. The image recognition method of claim 1, wherein the obtaining of the external voice information comprises:
    obtaining the external voice information through an external receiver connected to the smart terminal.

17. An image recognition device, comprising a processor and a memory storing an image recognition program executable by the processor to perform the image recognition method of claim 1.

18. A non-transitory computer readable storage medium storing thereon an image recognition program executable by a processor to perform the image recognition method of claim 1.

* * * * *